US011244185B2

(12) United States Patent
Nakagawa (10) Patent No.: US 11,244,185 B2
(45) Date of Patent: Feb. 8, 2022

(54) IMAGE SEARCH DEVICE, IMAGE SEARCH SYSTEM, AND IMAGE SEARCH METHOD (71) Applicant: NEC Corporation, Tokyo (JP)

(72) Inventor: Hidefumi Nakagawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 200 days.

(21) Appl. No.: 16/594,285

(22) Filed: Oct. 7, 2019

(65) Prior Publication Data
US 2020/0110955 A1 Apr. 9, 2020

(30) Foreign Application Priority Data

Oct. 9, 2018 (JP) .............................. JP2018-191292

(51) Int. Cl.
G06K 9/00 (2006.01)
G06K 9/20 (2006.01)
(Continued)

(52) U.S. Cl.
CPC ......... *G06K 9/2054* (2013.01); *G06F 16/535* (2019.01); *G06F 16/538* (2019.01); *G06F 16/5838* (2019.01); *G06K 9/00718* (2013.01); *G06K 9/00744* (2013.01); *G06K 9/4652* (2013.01); *G06K 9/6267* (2013.01)

(58) Field of Classification Search
CPC .............. G06K 9/2054; G06K 9/4652; G06K 9/00744; G06K 9/6267; G06K 9/00718; G06K 9/00684; G06K 2209/21; G06K 9/00778; G06K 9/00771; G06K 9/00993; G06K 9/03; G06K 9/627; G06K 9/6256; G06K 9/00671; G06K 9/6202; G06F 16/5838; G06F 16/535; G06F 16/538; G06F 16/907; G06F 16/583; G06F 16/58; G06F 16/9537; G06F 16/29; G06F 16/2264;
(Continued)

(56) References Cited

U.S. PATENT DOCUMENTS

2011/0255605 A1* 10/2011 Chang .................. G11B 27/034
375/240.18
2012/0189212 A1* 7/2012 Ren ..................... G06K 9/00758
382/218

(Continued)

FOREIGN PATENT DOCUMENTS

JP H10-207897 A 8/1998
JP 2003-067764 A 3/2003
(Continued)

OTHER PUBLICATIONS

A computer translated JP2003067764 (Year: 2003).*
Japanese Office Action for JP Application No. 2018-191292 dated Jul. 30, 2019 with English Translation.

*Primary Examiner* — Duy M Dang (57) ABSTRACT

An image search device includes an extractor configured to acquire an entire image including an area image that is an image of a target object and extract one or more combinations of the area image and attribute information from the entire image on the basis of color, an information storage unit configured to search for the area image combined with the designated attribute information from the extracted one or more combinations of the area image and the attribute information, and an interface configured to output a search result.

7 Claims, 10 Drawing Sheets (51) Int. Cl.
  *G06K 9/46* (2006.01)
  *G06F 16/583* (2019.01)
  *G06K 9/62* (2022.01)
  *G06F 16/535* (2019.01)
  *G06F 16/538* (2019.01)

(58) Field of Classification Search
  CPC ....... G06F 16/9024; G06T 7/20; G06T 7/215;
              G06T 7/254; G06T 7/285; H04N 7/181
  See application file for complete search history.

(56) References Cited

U.S. PATENT DOCUMENTS

2016/0217575 A1\* 7/2016 Bernal .................... G06T 7/254
2019/0149770 A1\* 5/2019 Oami ................ G06K 9/00771
                                                                348/143

FOREIGN PATENT DOCUMENTS

| JP | 2003-256834 A | 9/2003 |
| JP | 2007-011696 A | 1/2007 |
| JP | 2008-046832 A | 2/2008 |
| JP | 2010-015286 A | 1/2010 |
| JP | 2011-244043 A | 12/2011 |

\* cited by examiner

| | AREA IMAGE | | ATTRIBUTE |
|---|---|---|---|
| AREA IMAGE 200 | (car) | IMAGE IDENTIFIER A | PHOTOGRAPHING TIME<br>PHOTOGRAPHING PLACE<br>IMAGE IDENTIFIER A<br>REPRESENTATIVE COLOR 1(R,G,B)<br>REPRESENTATIVE COLOR 2(R,G,B)<br>REPRESENTATIVE COLOR 3(R,G,B) |
| AREA IMAGE 201 | (person) | IMAGE IDENTIFIER B | PHOTOGRAPHING TIME<br>PHOTOGRAPHING PLACE<br>IMAGE IDENTIFIER B<br>REPRESENTATIVE COLOR 1(R,G,B)<br>REPRESENTATIVE COLOR 2(R,G,B)<br>REPRESENTATIVE COLOR 3(R,G,B)<br>REPRESENTATIVE COLOR 4(R,G,B) |
| AREA IMAGE 202 | (person) | IMAGE IDENTIFIER C | PHOTOGRAPHING TIME<br>PHOTOGRAPHING PLACE<br>IMAGE IDENTIFIER C<br>REPRESENTATIVE COLOR 1(R,G,B)<br>REPRESENTATIVE COLOR 2(R,G,B)<br>REPRESENTATIVE COLOR 3(R,G,B)<br>REPRESENTATIVE COLOR 4(R,G,B) |
| AREA IMAGE 203 | (tree) | IMAGE IDENTIFIER D | PHOTOGRAPHING TIME<br>PHOTOGRAPHING PLACE<br>IMAGE IDENTIFIER D<br>REPRESENTATIVE COLOR 1(R,G,B)<br>REPRESENTATIVE COLOR 2(R,G,B) |

IMAGE SEARCH DEVICE, IMAGE SEARCH SYSTEM, AND IMAGE SEARCH METHOD

INCORPORATION BY REFERENCE

This application is based upon and claims the benefit of priority from Japanese patent application No. 2018-191292, filed Oct. 9, 2018, the disclosure of which is incorporated herein in its entirety by reference.

BACKGROUND OF THE INVENTION

Field of the Invention

The present invention relates to an image search device, an image search system, and an image search method.

Description of Related Art

An image search device may search for an area image included in an entire image from the entire image in some cases. For example, an image search device may search for an area image of a vehicle photographed by a monitoring camera from an entire image output from the monitoring camera.

The image search device records an entire time-series image and an area image of a target object in an information storage unit. The image search device associates attribute information with an area image of a specific target object. The image search device searches for the area image of a specific target object from the recorded entire time-series image. The image search device searches for the area image of a specific target object from the entire image by using a detection algorithm and parameters set in advance in accordance with an appearance of the specific target object.

In order to search for an area image of a specific target object from an entire image, a method of increasing an amount of attribute information of a target object used for the search has been proposed (refer to Japanese Unexamined Patent Application, First Publication No. 2011-244043, Japanese Unexamined Patent Application, First Publication No. 2010-015286, Japanese Unexamined Patent Application, First Publication No. 2008-046832, and Japanese Unexamined Patent Application, First Publication No. 2003-256834).

In above-mentioned Patent Documents, it is required that the searched target object and attribute information are associated with each other in advance. When the searched target object and attribute information are not associated with each other in advance, since a corresponding image search device requires to search for the area image of the target object without using the attribute information of the target object from a large number of photographed entire time-series images, it may not be possible to search for the area image of the target object within a practical time in some cases.

When a type of photographed target object greatly varies depending on a photographing environment, since it is difficult to associate the area images with the attribute information of a plurality of target object in advance, a detection algorithm of an area image is required for each target object. In this case, an amount of calculation required for detection processing may increase.

As described above, it may be difficult for the corresponding image search device to improve efficiency of searching for an area image of a photographed unspecified target object from an entire image.

SUMMARY OF THE INVENTION

In view of the above circumstances, an object of the present invention is to provide an image search device, an image search system, an image search method, and a program that solve the problems described above.

According to a first aspect of the present invention, an image search device includes an extractor configured to acquire an entire image including an area image that is an image of a target object and extract one or more combinations of the area image and attribute information from the entire image on the basis of color, an information storage unit configured to search for the area image combined with the designated attribute information from the extracted one or more combinations of the area image and the attribute information, and an interface configured to output a search result.

According to a second aspect of the present invention, an image search system comprises an image search device that has an extractor configured to acquire an entire image including an area image that is an image of a target object and to extract one or more combinations of the area image and attribute information from the entire image on the basis of color, an information storage unit configured to search for the area image combined with the designated attribute information from the extracted one or more combinations of the area image and the attribute information, and an interface for outputting a search result, a generation device configured to generate a parameter on the basis of a combination of the area image and the attribute information, and an extraction device configured to extract the area image from the entire image on the basis of the parameter.

According to a third aspect of the present invention, an image search method includes acquiring an entire image including an area image that is an image of a target object and extracting one or more combinations of the area image and attribute information from the entire image on the basis of color, searching for the area image combined with the designated attribute information from the extracted one or more combinations of the area image and the attribute information, and outputting a search result.

According to a fourth aspect of the present invention, a non-transitory computer-readable recording medium storing a program that causes a computer to execute acquiring an entire image including an area image that is an image of a target object and to extract one or more combinations of the area image and attribute information from the entire image on the basis of color, searching for the area image combined with the designated attribute information from the extracted one or more combinations of the area image and the attribute information, and outputting a search result.

According to the present invention, it is possible to improve an efficiency of searching for an area image of a photographed unspecified target object from an entire image.

DETAILED DESCRIPTION OF THE INVENTION

Embodiments of the present invention will be described in detail with reference to the drawings.

First Embodiment

Figure 1:
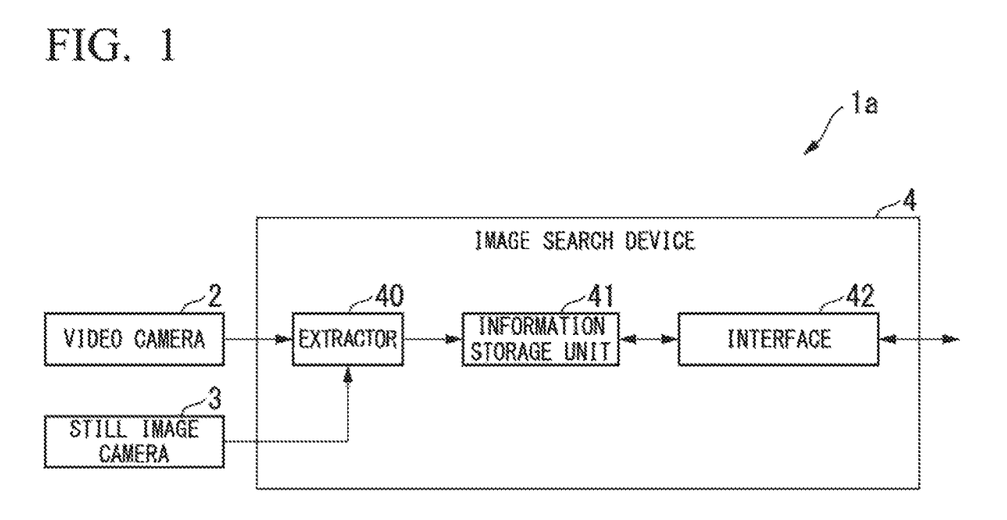
FIG. 1 is a diagram which shows an example of a configuration of an image search system in a first embodiment.

FIG. 1 is a diagram which shows an example of a configuration of an image search system 1a. The image search system 1a searches for an image of a photographed unspecified target object (subject) from a video image or a still image. The image search system 1a includes a video camera 2, a still image camera 3, and an image search device 4.

The video camera 2 outputs an entire video image (time series) including an area image that is an image of a target object and a background image to the image search device 4. The still image camera 3 outputs an entire still image including an area image that is the image of a target object and the background image to the image search device 4.

The image search device 4 is an information processing device that searches for the area image of a photographed unspecified target object from the video image or the still image, and is, for example, a personal computer. The image search device 4 includes an extractor 40, an information storage unit 41, and an interface 42.

A part or all of the extractor 40, the information storage unit 41, and the interface 42 are realized by a processor such as a central processing unit (CPU) executing a program stored in a storage unit. A part or all of the extractor 40, the information storage unit 41, and the interface 42 may also be realized, for example, using hardware such as a large-scale integration (LSI) or an application specific integrated circuit (ASIC).

The extractor 40 acquires at least one of the entire time-series image output from the video camera 2 and the entire still image output from the still image camera 3. The extractor 40 extracts one or more combinations of the area image and the attribute information of a target object on the basis of color from the acquired entire image. The attribute information is information on the attribute of the area image, and is, for example, information related to photographing such as information on a photographing time and a photographing place, an image identifier that is an identifier associating an area image with the attribute information, or information on a representative color (representative color) in the area image. For example, a representative color may be expressed in any of a format of red, blue, and green (RGB), which are three primary colors of light, a format of cyan, magenta, and yellow, and a key plate (CMYK), which are three primary colors, and a format of each color name.

Figure 2:
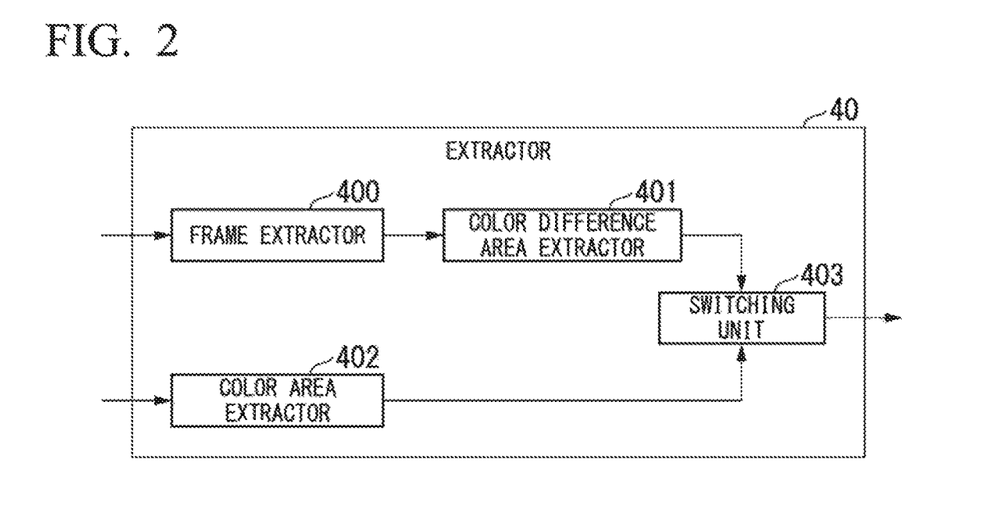
FIG. 2 is a diagram which shows an example of a configuration of an extractor in the first embodiment.

FIG. 2 is a diagram which shows an example of a configuration of the extractor 40. The extractor 40 includes a frame extractor 400, a color difference area extractor 401, a color area extractor 402, and a switching unit 403. The frame extractor 400 generates a frame image that is an image in units of frame (entire image) from entire time-series images.

The color difference area extractor 401 extracts an area image of a target object and attribute information of the target object from the frame image. The color difference area extractor 401 can extract an arbitrary number of area images of the target object in an arbitrary size from a frame image by adjusting a threshold value.

Figure 3:
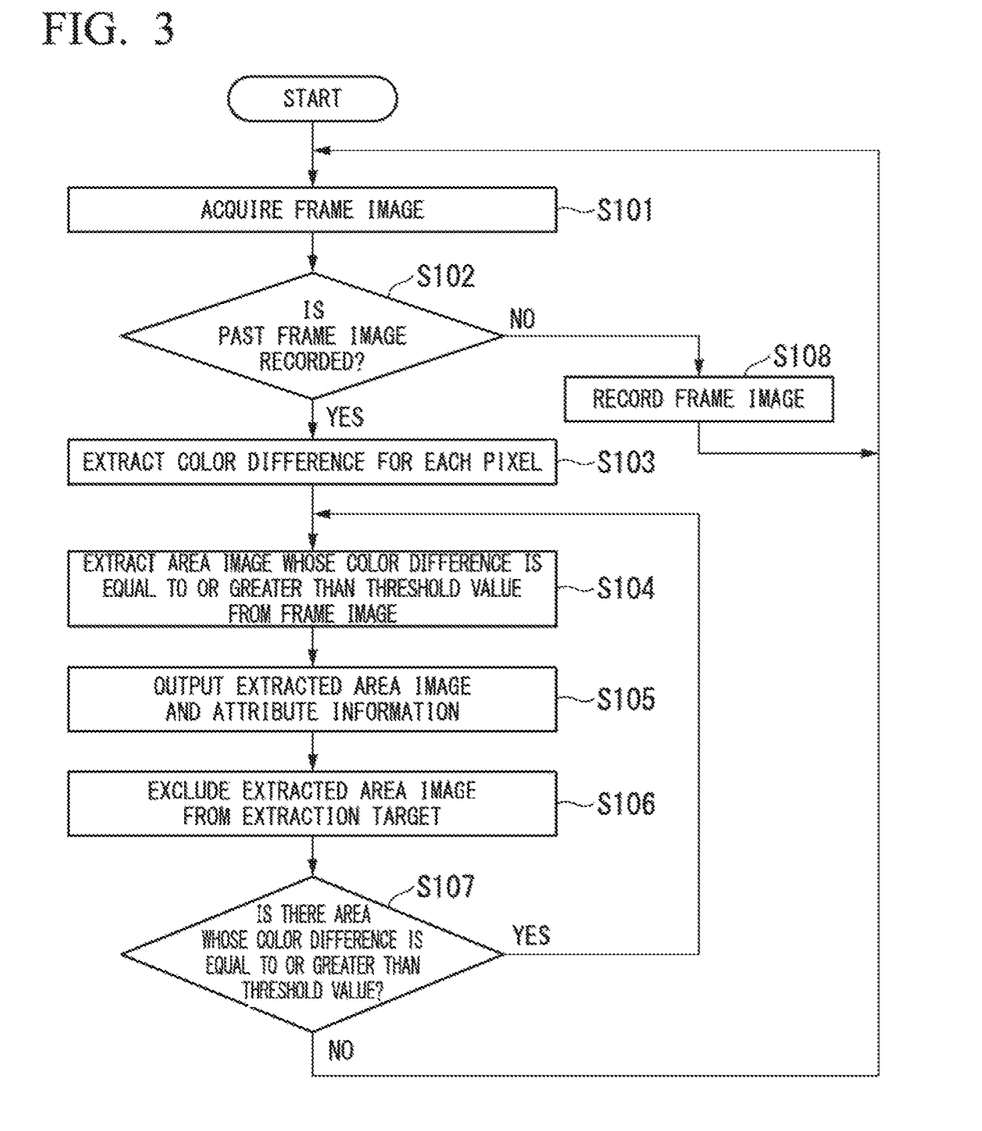
FIG. 3 is a flowchart which shows an example of operations of a frame extractor and a color difference area extractor in the first embodiment.

FIG. 3 is a flowchart which shows an example of operations of the frame extractor 400 and the color difference area extractor 401. The frame extractor 400 acquires a frame image from the video camera 2 (step S101). The frame extractor 400 determines whether a past (previous) frame image is recorded in a storage unit (step S102). When a past frame image is recorded in the storage unit (YES in step S102), the color difference area extractor 401 extracts a difference in color (color value) between a current frame image and a past (previous) frame image for each pixel (step S103).

The color difference area extractor 401 extracts an area image whose color difference is equal to or greater than a threshold value from the current frame image (step S104). The color difference area extractor 401 outputs the extracted area image and the attribute information to the switching unit 403 (step S105). The color difference area extractor 401 excludes, in preparation for branching to step S104 again, the extracted area image from an extraction target in the frame image of step S104 (step S106).

The color difference area extractor 401 determines whether there is an area whose color difference is equal to or greater than the threshold value in a current frame image (step S107). When there is an area whose color difference is equal to or greater than the threshold value in the current frame image (YES in step S107), the color difference area extractor 401 returns the processing to step S104. When there is no area whose color difference is equal to or greater than the threshold value in the current frame image, that is, when the area image of a target object is sufficiently extracted from the current frame image (NO in step S107), the color difference area extractor 401 returns the processing to step S101.

When a past (previous) frame image is not recorded in step S102 (NO in step S102), the color difference area extractor 401 records the current frame image in the information storage unit 41 as a previous frame image (step S108).

Figure 4:
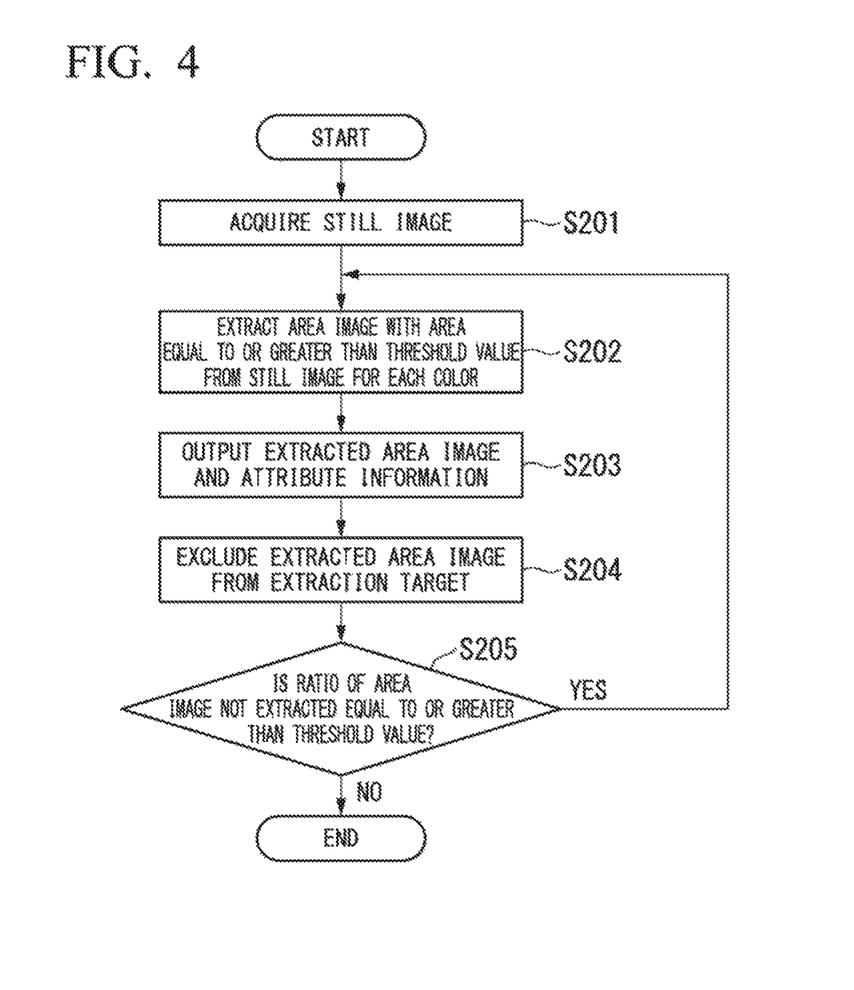
FIG. 4 is a flowchart which shows an example of an operation of a color area extractor in the first embodiment.

The color area extractor 402 extracts the area image of a target object and the attribute information of the target object from a still image. The color area extractor 402 can extract the arbitrary number of area images of a target object in an arbitrary size from a still image by adjusting the threshold value.

FIG. 4 is a flowchart which shows an example of an operation of the color area extractor 402. The color area extractor 402 acquires a still image from the still image camera 3 (step S201). The color area extractor 402 extracts the area image of an area equal to or larger than the threshold value from the still image for each color (step S202).

Figure 5:
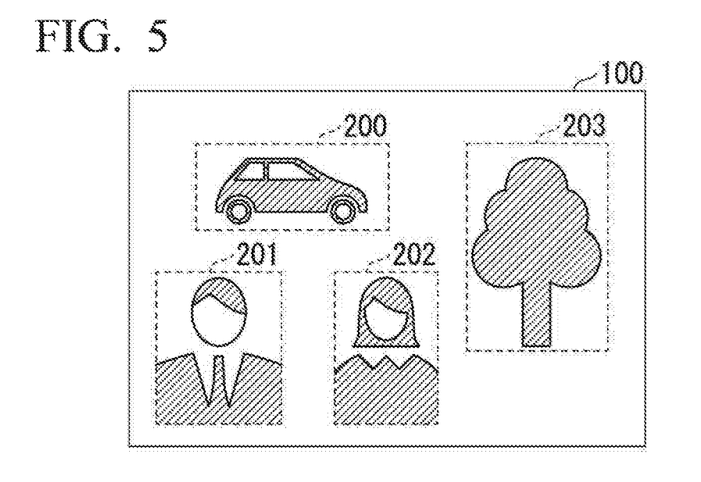
FIG. 5 is a diagram which shows an example of a still image in the first embodiment.

FIG. 5 is a diagram which shows an example of a still image 100. The still image 100 is an image acquired from the still image camera 3. The still image 100 may be a frame image acquired from the video camera 2. In FIG. 5, the color area extractor 402 extracts an area image 200, an area image 201, an area image 202, and an area image 203 from the still image 100.

Returning to FIG. 4, the example of the operation of the color area extractor 402 will be continuously described. The color area extractor 402 outputs the extracted area image and the attribute information to the switching unit 403 (step S203). The color area extractor 402 excludes the extracted area image from the extraction target (step S204).

The color area extractor 402 determines whether an area ratio of an area image which is not extracted is equal to or greater than a threshold value with respect to an area of a still image (step S205). When the area ratio of the area image which is not extracted is equal to or greater than the threshold value with respect to the area of a still image (YES in step S205), the color area extractor 402 returns the processing to step S202. When the area ratio of the area image which is not extracted is less than the threshold value with respect to the area of a still image (NO in step S205), the color area extractor 402 ends the processing shown in FIG. 4.

Accordingly, since the extractor 40 does not require to prepare an algorithm for detecting the area image of a target object for each type of a target object, it is possible to extract the area image of a target object. The extractor 40 can extract the area image of a target object from a frame image or a still image as pre-processing for a large amount of video image or still image covering a wide range of time or space such as an output of a monitoring camera, an output of a fixed-point camera, or an online map using photos.

The switching unit 403 shown in FIG. 2 selects, for example, a frame image (video image) or a still image on the basis of an instruction of a user. The switching unit 403 records the selected area image extracted from an entire image and the attribute information of the area image in the information storage unit 41. Note that the switching unit 403 may record a frame image (video image) or a still image that is the selected entire image in the information storage unit 41.

The information storage unit 41 shown in FIG. 1 is an information processing device. The information storage unit 41 includes a non-volatile recording medium (non-transitory recording medium). The information storage unit 41 stores a video image, a still image, a data table, and a program. The information storage unit 41 may include a volatile recording medium such as a random access memory (RAM).

The information storage unit 41 stores an image attribute information table. The information storage unit 41 records the area image and the attribute information output from the switching unit 403 in the image attribute information table.

The information storage unit 41 acquires the area image and the attribute information of a target object from the interface 42 as a query that is a search condition (extraction condition) of the target object. The information storage unit 41 may also record the attribute information included in the query given by a user in the image attribute information table in association with the area image of a target object as additional attribute information.

The information storage unit 41 searches for the area image of a target object from an entire image on the basis of a representative color, a photographing time, a photographing place, and the like designated by the user. The information storage unit 41 selects one or more combinations of one or more area images and the attribute information corresponding to a query from combinations of area images and attribute information in the image attribute information table. That is, the information storage unit 41 searches for an area image combined with designated attribute information from the image attribute information table.

Figure 6:
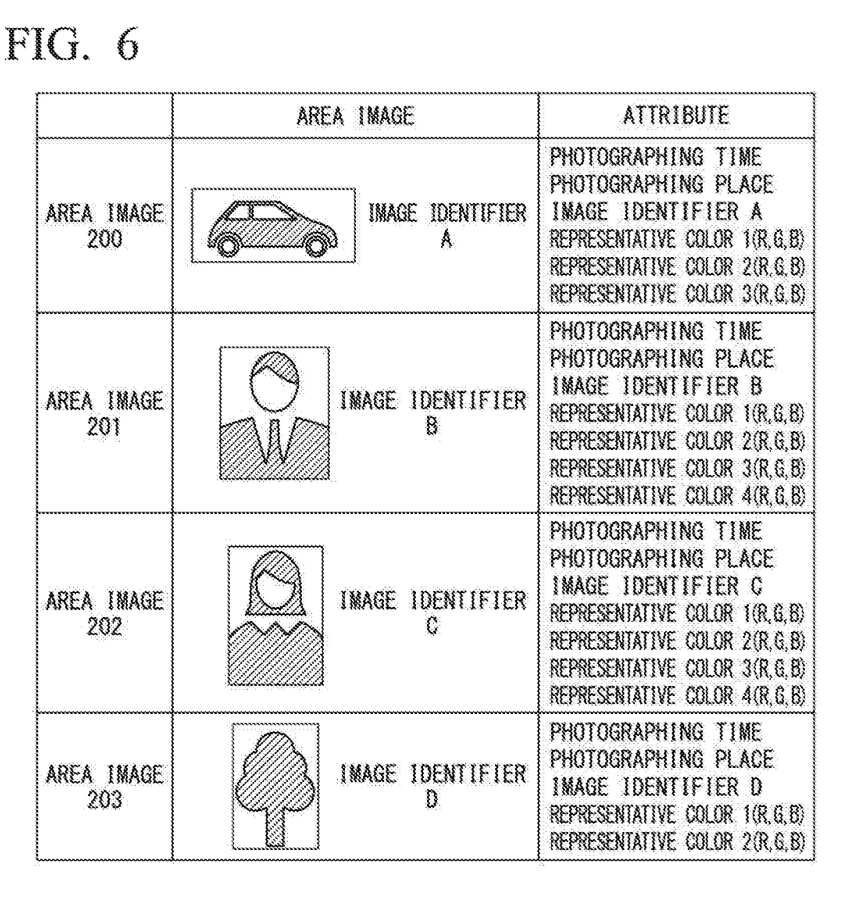
FIG. 6 is a diagram which shows an example of an image attribute information table in the first embodiment.

FIG. 6 is a diagram which shows an example of the image attribute information table. In FIG. 6, the image attribute information table includes the area image 200 to the area image 203 extracted from the still image 100 and each piece of attribute information.

The number of representative colors in an area image varies depending on a target object. Since the area image of a target object is extracted from an entire image on the basis of color, the image attribute information table may not include information indicating a type of a target object (what the target object is) as the attribute information. In other words, the type of a target object (what the target object is) of an area image included in a video image or a still image does not require to be settled when the area image of a target object is extracted. For this reason, a complicated extraction algorithm for each type of a target object is not necessary.

As a result, the information storage unit 41 can extract, from a frame image or a still image, incomparably more area images of a target object than in a method in which area images of a target object to be extracted is limited. The information storage unit 41 can greatly enhance an ability to search for an area image from a frame image and a still image.

The interface 42 includes a display device such as a liquid crystal display, an organic electro luminescence (EL) display, and an operation device such as a button or a touch panel. The interface 42 displays an interface image for a user to designate a query. The user designates the representative color, the photographing time, and the photographing place of the area image of a target object in the interface 42 as a query. The interface 42 acquires the area image and the attribute information of a target object as a query given from the user. The interface 42 acquires a search result from the information storage unit 41. The interface 42 outputs the search result. That is, the interface 42 displays an image representing the search result.

The user may input additional attribute information to be added to the image attribute information table to the interface 42. The interface 42 outputs the representative color, the photographing time, and the photographing place of the area image of a target object to the information storage unit 41 as the additional attribute information of the target object.

Figure 7:
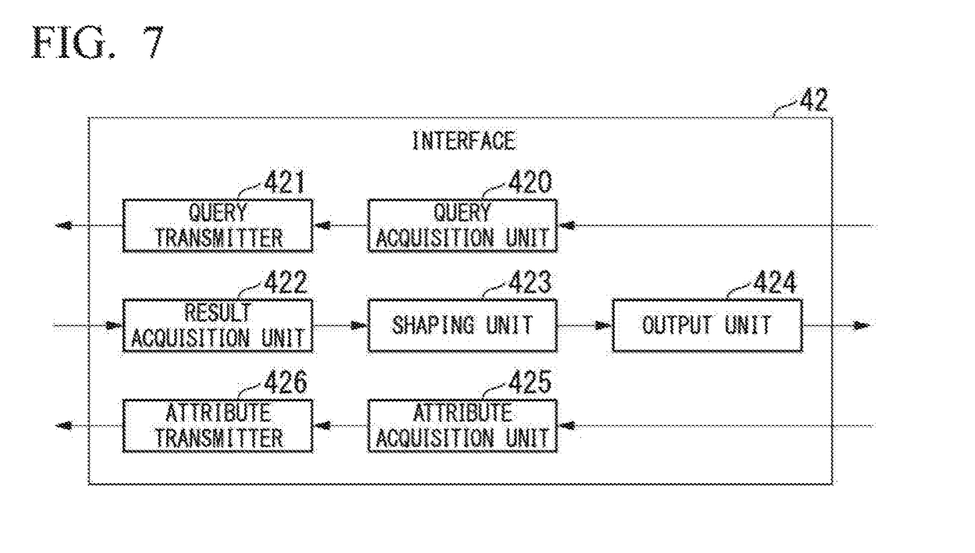
FIG. 7 is a diagram which shows an example of a configuration of an interface in the first embodiment.

FIG. 7 is a diagram which shows an example of a configuration of the interface 42. The interface 42 displays the area image and the attribute information of a target object that satisfies a search condition (query) as an image representing a search result. The interface 42 includes a query acquisition unit 420, a query transmitter 421, a result acquisition unit 422, a shaping unit 423, an output unit 424, an attribute acquisition unit 425, and an attribute transmitter 426.

The query acquisition unit 420 acquires a query as a search condition (extraction condition) designated by the user. The search condition is a condition for narrowing down the area image from a plurality of area images on the basis of the attribute information. The query transmitter 421 transmits the query to the information storage unit 41.

The result acquisition unit 422 acquires the area image and the attribute information from the information storage unit 41 as a search result. The shaping unit 423 acquires the area image and the attribute information from the result acquisition unit 422. The shaping unit 423 executes shaping processing on an image displayed by the interface 42.

For example, the shaping unit 423 adjusts a size and an arrangement of an area image on a screen and a size and an arrangement of an image of attribute information. The shaping unit 423 outputs the area image and the attribute information whose sizes or the like have been adjusted to the output unit 424.

The output unit 424 displays an area image and attribute information whose sizes or the like on a screen are adjusted as a search result for a query. The attribute acquisition unit 425 acquires additional attribute information according to an operation input by a user. The attribute transmitter 426 acquires the additional attribute information from the attribute acquisition unit 425. The attribute transmitter 426 transmits the additional attribute information to the information storage unit 41.

Figure 8:
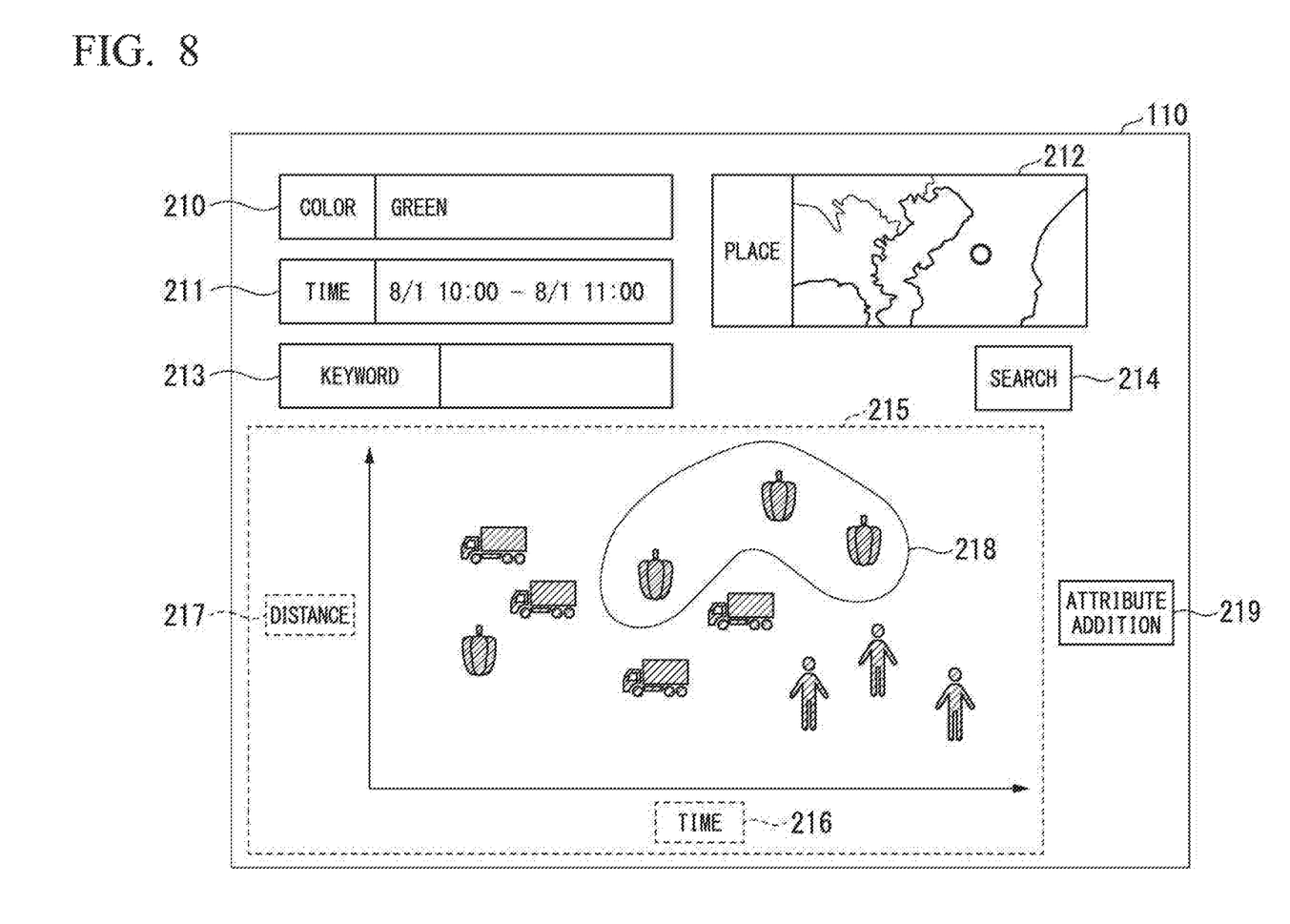
FIG. 8 is a diagram which shows an example of a display image such as a search result in the first embodiment.

FIG. 8 is a diagram which shows an example of the display image 110 such as a search result. The display image 110 includes, as an example, a color input area 210, a time input area 211, a place input area 212, a keyword input area 213, a search operation key 214, a result display area 215, a time display area 216, a distance display area 217, a target designation area 218, and an additional operation key 219.

The color input area 210 is an area for a user to input information on a color of a target object to be searched as a query. The time input area 211 is an area for the user to input a photographing time zone of the target object to be searched as a query. The place input area 212 is an area for the user to input the photographing place of a target object to be searched as a query.

The keyword input area 213 is an area for the user to input a keyword (character string or the like) to be searched from the attribute information. A query includes, for example, a keyword, information on a color of a target object, information on a photographing time zone of a target object, and information on a photographing place of a target object. The search operation key 214 is a key (operation button) for operating a start or stop of a search. The user operates the search operation key 214 after entering a query into the input area.

The result display area 215 is a display area of an area image and attribute information that are search results. In the result display area 215, the area image and the attribute information output from the output unit 424 are displayed.

In the result display area 215, a distance from a designated place to the target object is displayed for each time. In FIG. 8, the user has designated green, and thereby a result of searching for a green area image in the image attribute information table by the information storage unit 41 is displayed in the result display area 215.

That is, each green area image is displayed in the result display area 215 on the basis of the information on a color input to the color input area 210, the information on a photographing time input to the time input area 211, and the information on a photographing place 7-3 input to the place input area 212. The result display area 215 also includes an area image other than a pepper.

The time display area 216 is a display area of a label of time information included in the attribute information.

The distance display area 217 is a display area of a label of a distance from a place (place indicated by the place input area 212) indicated by place information included in the attribute information to the target object.

The target designation area 218 is an area in which one or more area images of the target object to which additional attribute information is input are selected. The user can select an area image by designating a range on the screen by operating a mouse or the like. In FIG. 8, the user selects three area images of pepper that are target objects to which the additional attribute information is input. In FIG. 8, three pepper area image that is area image of an object for each time is selected.

The additional operation key 219 is an operation key for causing the interface 42 to display a display image for a user to input the additional attribute information. The user presses the additional operation key 219.

Figure 9:
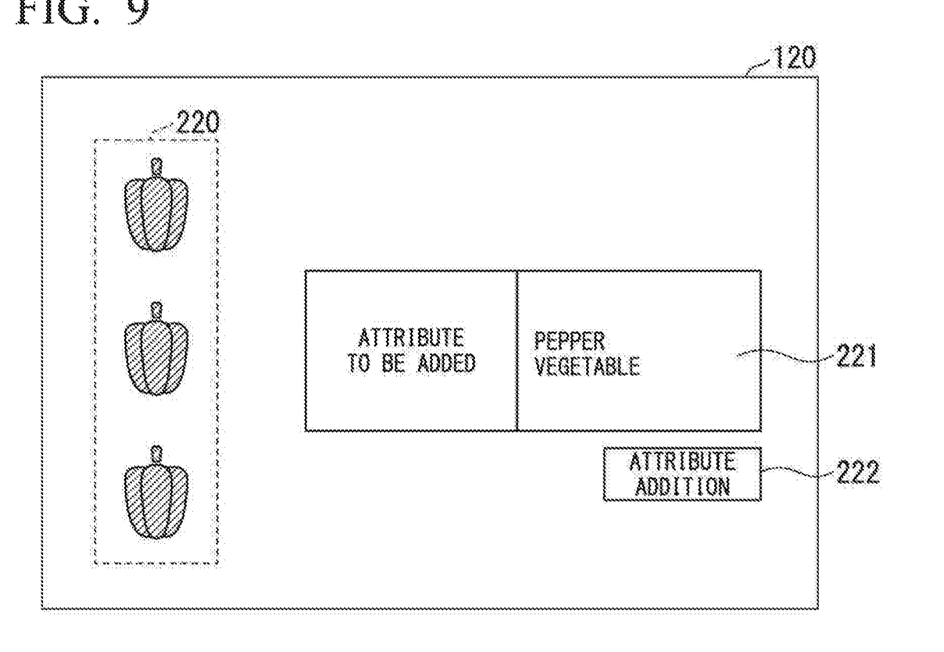
FIG. 9 is a diagram which shows an example of a display image for inputting additional attribute information in the first embodiment.

FIG. 9 is a diagram which shows an example of a display image 120 for inputting the additional attribute information. The interface 42 displays the display image 120 when the additional operation key 219 is pressed.

The display image 120 includes a selected area image 220, an attribute input area 221, and an additional operation key 222.

The selected area image 220 includes each area image selected in the target designation area 218 shown in FIG. 8. The attribute input area 221 is an area for inputting the additional attribute information. The additional operation key 222 is an operation key for a user to instruct a start of processing of recording the additional attribute information in the image attribute information table.

The user inputs additional attribute information to the attribute input area 221 and presses the additional operation key 222, thereby the additional attribute information can be given to each area image of the selected area image 220. The additional attribute information is used for searching for each area image of the selected area image 220. In FIG. 9, as an example, the user instructs a start of processing of recording the additional attribute information such as "pepper" and "vegetable" in the image attribute information table for each area image of green pepper. As a result, the additional attribute information is associated with the area image in the image attribute information table.

Next, an example of an operation of the image search system 1*a* will be described.

Figure 10:
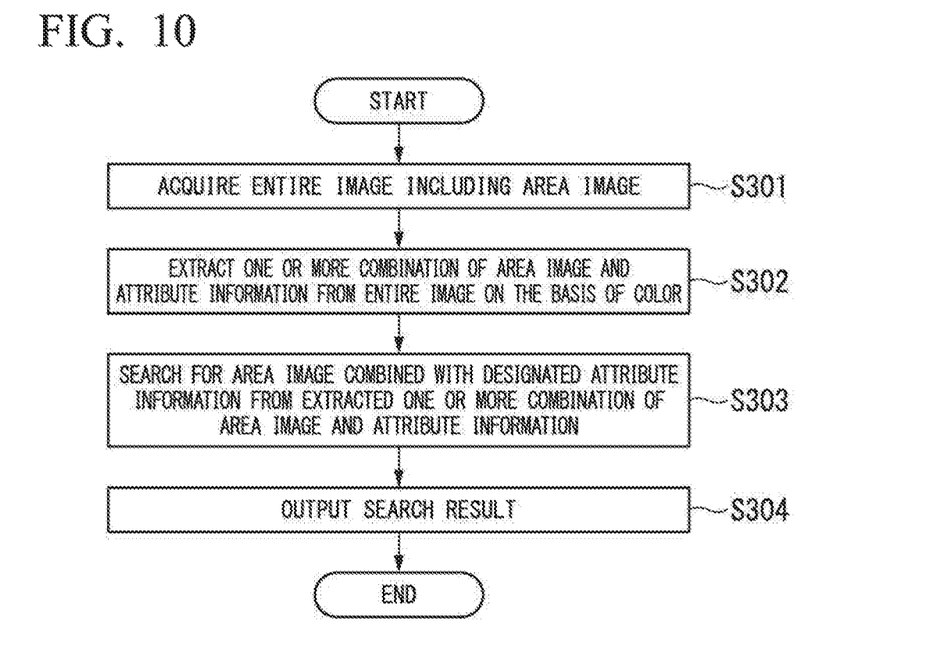
FIG. 10 is a flowchart which shows an example of an operation of an image search system in the first embodiment.

FIG. 10 is a flowchart which shows an example of an operation of an image search system. The extractor 40 acquires an entire image including an area image (step S301). The extractor 40 extracts one or more combinations of an area image and attribute information from the entire image on the basis of color (step S302). The information storage unit 40 searches for an area image combined with designated attribute information from the extracted one or more combinations of the area image and the attribute information (step S303). The interface 42 outputs a search result (step S304).

As described above, the image search device 4 of the first embodiment includes the extractor 40, the information storage unit 41, and the interface 42. The extractor 40 acquires the entire image including an area image that is the image of a target object. The extractor 40 extracts one or more combinations of the area image and attribute information from the entire image on the basis of color. The information storage unit 41 searches for the area image combined with designated attribute information from the extracted one or more combinations of the area image and the attribute information. The interface 42 outputs a search result.

Accordingly, the image search device 4 of the first embodiment may improve efficiency of searching for the area image of a photographed unspecified target object from the entire image.

The image search device 4 extracts the area image and the attribute information of a target object from an entire image on the basis of a change in color of the entire image. The image search device 4 stores the extracted area image and the attribute information as a data table. As a result, the image search device 4 outputs a search result promptly, and thus the user can promptly determine a validity of the search result. The image search device 4 may give additional attribute information such as a name to the attribute information of the obtained area image or an image similar thereto. The image search device 4 can expand a search target using the additional attribute information.

The image search device 4 does not require an algorithm in accordance with the type of a target object when the area image of a target object is extracted from a video image or a still image. That is, the image search device 4 can extract the area image of a target object from a still image or a video image even if an algorithm in accordance with the target object is not introduced.

Even if the attribute information is not associated with the area image in advance because the area image of a target object is not included in the entire image, the image search device 4 can extract the area image of a target object from a still image or a video image. That is, the image search device 4 does not require pre-processing for extracting the area image of an unspecified target object (new target object) from the entire image. For this reason, the image search device 4 can extract the area image of a target object from a still image or a video image in a short period of time.

The image search device 4 gives the attribute information to the area image of a target object regardless of the type of the target object if a characteristic change such as in color is in the video image or the still image. For this reason, the extraction processing becomes simpler, and the image search device 4 can give more pieces of attribute information to the area image of the target object in a short period of time.

Since the image search device 4 does not require to record information indicating the type of a target object in a storage unit, it is possible to record many area images of the target object in the storage unit. Since the image search device 4 does not require to go back in time and to search for the area image of a target object from a large amount of entire image, it is possible to list more area images of the target object. The image search device 4 can extract an area image included in the entire image in a short period of time.

Since the image search device 4 does not require to use the information indicating the type of a target object for a search, it is possible to greatly reduce an amount of calculation required for extracting the area image of a target object. The image search device 4 can extract more area image of a target object in a short period of time. The image search device 4 may search for the area image of a target object on the basis of additional attribute information.

Second Embodiment

A second embodiment is different from the first embodiment in that an image search system generates a parameter suitable for detecting the area image of a target object. A difference of the second embodiment from the first embodiment will be described.

Figure 11:
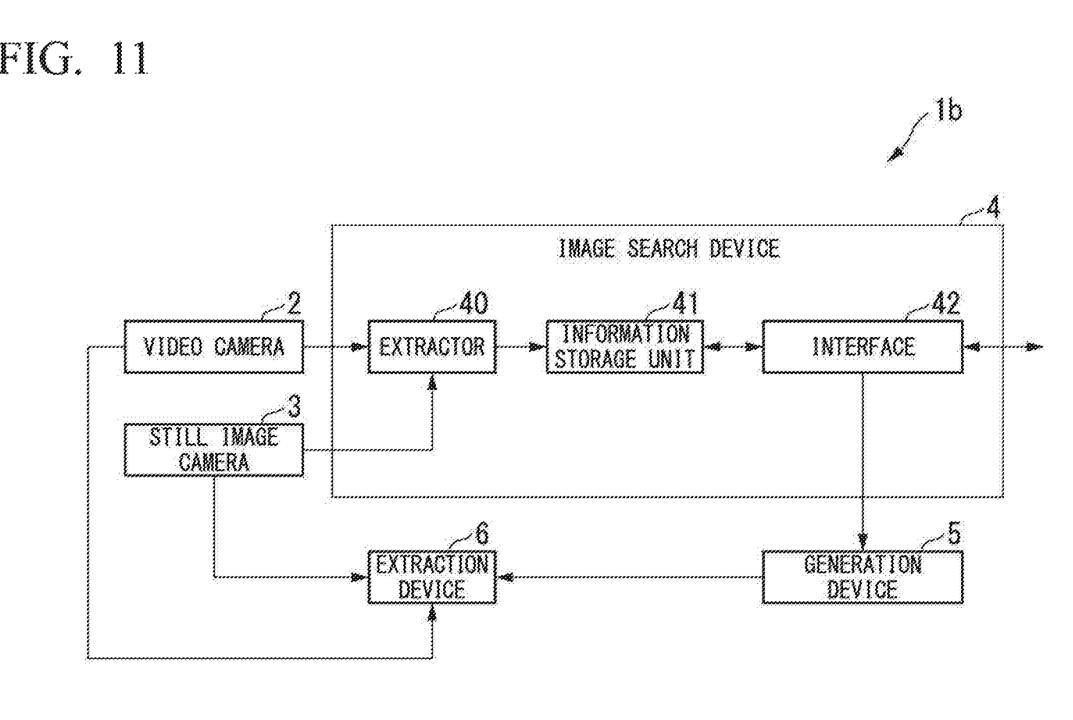
FIG. 11 is a diagram which shows an example of the configuration of an image search system in a second embodiment.

FIG. 11 is a diagram which shows an example of the configuration of an image search system 1b. The image search system 1b includes a video camera 2, a still image camera 3, an image search device 4, a generation device 5, and an extraction device 6. The image search device 4 may also include the generation device 5 and the extraction device 6.

The generation device 5 is an information processing device, for example, a personal computer. The generation device 5 acquires the area image and the attribute information of a target object designated by the user as a detection target from the interface 42. The generation device 5 generates a parameter used in an algorithm for searching for the area image of a target object. The generation device 5 generates a parameter on the basis of one or more area images and the attribute information of the target object designated by the user as a detection target. The algorithm for generating a parameter executed by the generation device 5 may be a known algorithm for generating a parameter. Since the generation device 5 generates a parameter on the basis of the actual area image and attribute information, accuracy of the parameter can be increased even if the known algorithm for generating a parameter is used.

The extraction device 6 acquires a parameter used in an algorithm for searching for the area image of a target object from the generation device 5 as a parameter suitable for the detection of the area image of a target object. The extraction device 6 acquires an entire image of a video image (time-series) including the area image of a target object and the background image from the video camera 2. The extraction device 6 acquires an entire image of a still image including the area image of a target object and the background image from the still image camera 3.

The extraction device 6 executes an algorithm for detecting the area image of a target object on at least one of the entire image of a video image (time-series) and the entire image of a still image. The extraction device 6 executes the algorithm using the parameter generated by the generation device 5. That is, the extraction device 6 executes the algorithm using the parameter suitable for the detection of the area image of a target object.

As described above, the image search system 1b of the second embodiment includes the image search device 4, the generation device 5, and the extraction device 6. The image search device 4 includes the extractor 40, the information storage unit 41, and the interface 42. The generation device 5 generates a parameter on the basis of a combination of an actual area image and the attribute information. The extraction device 6 extracts the area image from an entire image on the basis of the parameter.

As a result, the image search device 4 of the second embodiment can further improve efficiency of searching for the area image of a photographed unspecified target object from an entire image.

The generation device 5 can acquire the area image and the attribute information of a target object from the image search device 4 and generate a parameter on the basis of the area image and the attribute information of a target object even if a photographing condition is changed in accordance with performance of a camera, a photographing place, a photographing time, or the like.

Third Embodiment

A third embodiment is different from the second embodiment in that the extraction device 6 classifies the area image of a non-defective target object and the area image of a defective target object. A difference of the third embodiment from the second embodiment will be described.

Figure 12:
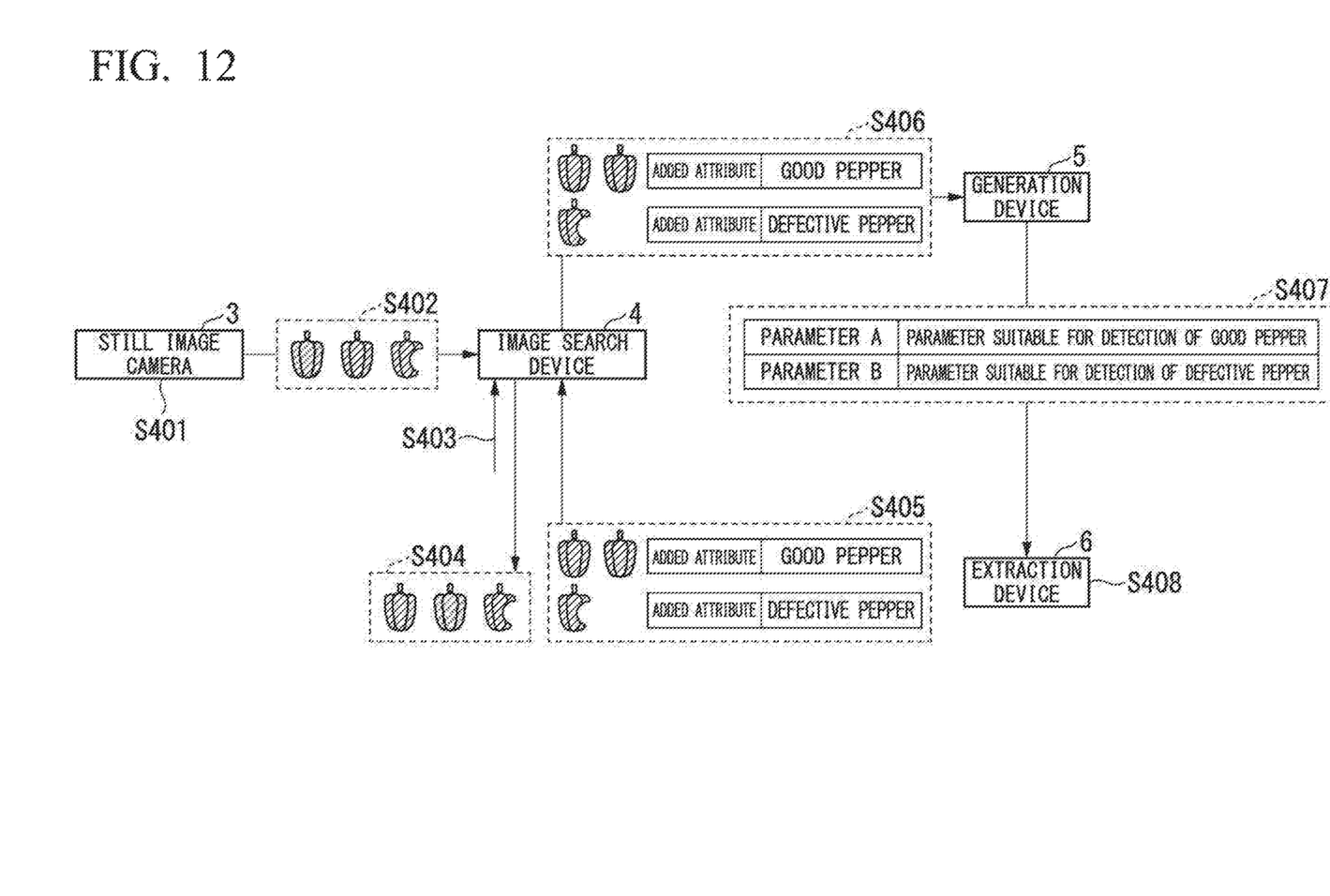
FIG. 12 is a diagram which shows an example of an operation of an image search system in a third embodiment.

FIG. 12 is a diagram which shows an example of an operation of the image search system 1b. In FIG. 12, a target object is a pepper as an example. The still image camera 3 photographs two good peppers and one defective pepper as an example (step S401). The still image camera 3 outputs a still image including an area image of two good peppers and an area image of one defective pepper to the image search device 4 (step S402).

The image search device 4 acquires information indicating a green color as a query as a search condition designated by a user. The image search device 4 searches for an area image of the designated green color from the still image (step S403). The image search device 4 displays each area image of the designated green color, that is, the area image of green peppers (step S404).

The image search device 4 acquires additional attribute information in accordance with an operation input by a user. The additional attribute information includes attribute information of "good pepper" associated with the area image of two good peppers and attribute information of "defective pepper" associated with the area image of one defective pepper (step S405). The image search device 4 transmits the additional attribute information to the generation device 5 (step S406).

The generation device 5 generates a parameter on the basis of the area image and the attribute information of two good peppers and the area image and the attribute information of one defective pepper. An algorithm for generation of a parameter may be a known algorithm for the generation of a parameter. The generation device 5 outputs the generated parameter to the extraction device 6 (step S407). The extraction device 6 classifies the area image of a good pepper and the area image of a defective pepper using a detection algorithm and a parameter. In other words, the extraction device 6 classifies the area image of a target object into the area image of a good product and the area image of a defective product. A detection algorithm used for this classification may be a known detection algorithm used for classification (step S408).

As described above, the image search system 1b of the third embodiment includes the image search device 4, the generation device 5, and the extraction device 6. The image search device 4 includes the extractor 40, the information storage unit 41, and the interface 42. The interface 42 acquires additional attribute information from each target object. The generation device 5 generates a parameter on the basis of a combination to which additional attribute information is added. The additional attribute information is information representing, for example, whether the target object is a good product or a defective product. The extraction device 6 classifies the area image on the basis of a parameter.

As a result, the image search device 4 of the third embodiment can improve efficiency of searching for the area image of a photographed unspecified target object from an entire image. The image search device 4 can improve accuracy in determining good and defective target objects.

Figure 13:
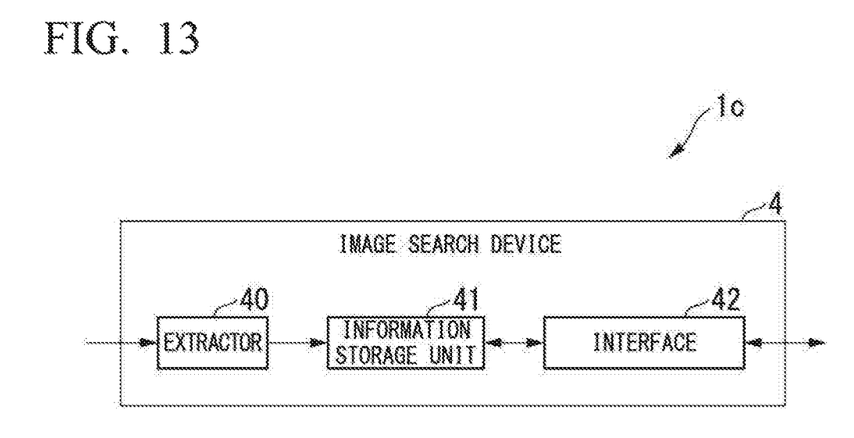
FIG. 13 is a diagram which shows an example of a minimum configuration of the image search system in each embodiment.

FIG. 13 is a diagram which shows an example of a minimum configuration of an image search system 1c. The image search system 1c includes the image search device 4. The image search device 4 includes the extractor 40, the information storage unit 41, and the interface 42. As a result, the image search device 4 can improve the efficiency of searching for the area image of a photographed unspecified target object from the entire image.

As described above, the embodiments of the present invention have been described in detail with reference to the drawings, but a specific configuration is not limited to these embodiments, and includes a design and the like within a range not departing from the gist of the present invention.

For example, an image search device in the embodiments may be implemented using a plurality of information processing devices which are communicably connected via a network. In other words, each functional unit included in the image search device may be distributed and implemented in a plurality of information processing devices providing a cloud service.

For example, the extractor 40 in the embodiment may extract the attribute information of a target object by, for example, machine learning such as deep learning.

The image search device 4 may be applied to the following respective fields (1), (2), and (3). These fields are examples of application.

(1) Search Service of Area Image in Entire Image Output from Image Database

Some map services on the Internet provide a scene viewed from a designated point. Those to be searched by such a service are based on map data such as place names and facility names disposed on the map. The image search device 4 continuously adds attribute information to the area image of an arbitrary target object included in an image. As a result, the image search device 4 can search for the area image of a target object (for example, an airplane, fish) that cannot be designated in map data.

(2) Search Service of Area Image in Entire Image Output from Monitoring Camera (Security Camera) for Business Use When any incident or accident has occurred, a video photographed by a monitoring camera installed in a facility or street may be useful for understanding a fact and searching for a target object such as a criminal. The image search device 4 can display a list of the area images of target objects included in a video image or a still image captured in a certain time zone. The image search device 4 can select an area image from a plurality of area images of a target object under a certain condition. A user can immediately start to search for the area image of a target object.

(3) Search Service of Area Image in Entire Image Output from Monitoring Camera for Consumer Use In recent years, a use of a monitoring camera for consumer use is increasing, such as confirming safety of family members living in remote areas or watching a state of a pet when a host of the pet is not present. The monitoring camera for consumer use may adopt a technology of recognizing faces or figures. It may also be possible to track the area image of a designated person or pet in an image. In order to effectively use such a monitoring camera for consumer use, a technology of recognizing an unspecified target object in an image is required, but the target object photographed at a household varies for each household. For this reason, it is difficult to realize recognition of a target object using a common detection algorithm. The image search device 4 can gradually increase the type of a recognizable target object by setting an area image whose color or the like changes in an image output from a monitoring camera for consumer use as the area image of a main target object. The image search device 4 can optimize, for each household, a parameter of a detection algorithm of the area image of a different target object for each household, and cause the area image of a target object to be recognized.

The present invention is applicable to an image search system which searches for an area image from an entire image output from an image database, a monitoring camera, or the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image search device comprising:
at least one memory configured to store instructions; and
at least one processor configured to execute the instructions to:
acquire an entire image including an area image that is an image of a target object and extract one or more combinations of the area image and attribute information from the entire image on the basis of color;
search for the area image combined with the designated attribute information from the extracted one or more combinations of the area image and the attribute information; and
output a search result,
wherein the entire image is a frame image of a video image, and
the at least one processor is configured to execute the instructions to extract the area image whose color difference between a plurality of frame images is equal to or greater than a threshold value from the frame images.

2. The image search device according to claim 1,
wherein the entire image is a still image, and
the at least one processor is configured to execute the instructions to extract the area image of an area equal to or greater than a threshold value from the still image for each color.

3. The image search device according to claim 1,
wherein the attribute information is at least one of information on a photographing time of the area image, information on a photographing place of the area image, an identifier of the area image, and information on a color of the area image.

4. The image search device according to claim 1,
wherein the at least one processor is configured to execute the instructions to:
acquire the attribute information to be added, and
add the attribute information to be added to the selected combination of the area image.

5. The image search device according to claim 1,
wherein the at least one processor is configured to execute the instructions to display a distance from a designated place to the target object for each time.

6. An image search system comprising:
an image search device that comprises:
at least one memory configured to store instructions; and
at least one processor configured to execute the instructions to;
acquire an entire image including an area image that is an image of a target object and to extract one or more combinations of the area image and attribute information from the entire image on the basis of color;
search for the area image combined with the designated attribute information from the extracted one or more combinations of the area image and the attribute information; and
output a search result;
a generation device configured to generate a parameter on the basis of a combination of the area image and the attribute information; and
an extraction device configured to extract the area image from the entire image on the basis of the parameter,
wherein the at least one processor is configured to execute the instructions to acquire the attribute information to be added for each target object,
the generation device is configured to generate the parameter on the basis of the combination to which the attribute information is added, and
the extraction device is configured to classify the area image on the basis of the parameter.

7. An image search method comprising:
acquiring an entire image including an area image that is an image of a target object and extracting one or more combinations of the area image and attribute information from the entire image on the basis of color;
searching for the area image combined with the designated attribute information from the extracted one or more combinations of the area image and the attribute information; and
outputting a search result,
wherein the entire image is a frame image of a video image, and
in the extracting, the area image whose color difference between a plurality of frame images is equal to or greater than a threshold value, is extracted from the frame images.

* * * * *